(12) United States Patent
Niitsuma

(10) Patent No.: US 11,124,395 B2
(45) Date of Patent: Sep. 21, 2021

(54) REEL BRAKING ADJUSTMENT DEVICE AND REEL BRAKING ADJUSTMENT PROGRAM

(71) Applicant: Shimano Inc., Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 88 days.

(21) Appl. No.: 16/599,914

(22) Filed: Oct. 11, 2019

(65) Prior Publication Data

US 2020/0165109 A1   May 28, 2020

(30) Foreign Application Priority Data

Nov. 28, 2018   (JP) .............................. JP2018-222346

(51) Int. Cl.
| | | |
|---|---|---|
| *A01K 89/01* | (2006.01) | |
| *B66D 1/40* | (2006.01) | |
| *A01K 89/0155* | (2006.01) | |
| *B66D 1/30* | (2006.01) | |
| *A01K 89/015* | (2006.01) | |

(52) U.S. Cl.
CPC ............ *B66D 1/40* (2013.01); *A01K 89/0182* (2015.05); *A01K 89/01555* (2013.01); *A01K 89/01931* (2015.05); *B66D 1/30* (2013.01)

(58) Field of Classification Search
CPC .......... A01K 89/0122; A01K 89/01555; A01K 89/01556; A01K 89/0182; A01K 89/033; B66D 1/485; B66D 1/505; B66D 1/525
See application file for complete search history.

(56) References Cited

U.S. PATENT DOCUMENTS

| | | | | |
|---|---|---|---|---|
| 6,045,076 A | * | 4/2000 | Daniels ............ | A01K 89/01555 188/268 |
| 6,109,555 A | * | 8/2000 | Svenson ............ | A01K 89/0155 242/287 |
| 2005/0211812 A1 | * | 9/2005 | Nakagawa ....... | A01K 89/01555 242/223 |
| 2008/0017739 A1 | * | 1/2008 | Beckham ........... | A01K 89/0155 242/288 |
| 2009/0095835 A1 | * | 4/2009 | Beckham ........... | A01K 89/0155 242/286 |
| 2010/0170977 A1 | * | 7/2010 | Trell .................. | A01K 89/0155 242/305 |
| 2011/0259988 A1 | * | 10/2011 | Strohecker ......... | A01K 89/0183 242/285 |

FOREIGN PATENT DOCUMENTS

JP   2004-357601 A   12/2004

* cited by examiner

*Primary Examiner* — Emmanuel M Marcelo
(74) *Attorney, Agent, or Firm* — Global IP Counselors, LLP

(57) ABSTRACT

A reel braking adjustment device includes a tensile force-related information acquisition unit and a braking parameter correction unit. The tensile force-related information acquisition unit is configured to acquire tensile force-related information. The tensile force-related information is information that is related to tensile force acting on a fishing line and detected during a fishing line discharge period in which the fishing line is released from a dual-bearing reel configured to brake rotation of a spool based on a braking parameter. The braking parameter correction unit is configured to correct braking parameters based on temporal changes in the tensile force-related information acquired by the tensile force-related information acquisition unit.

8 Claims, 7 Drawing Sheets

REEL BRAKING ADJUSTMENT DEVICE AND REEL BRAKING ADJUSTMENT PROGRAM

CROSS-REFERENCE TO RELATED APPLICATIONS

This application claims priority to Japanese Patent Application No. 2018-222346, filed on Nov. 28, 2018. The entire disclosure of Japanese Patent Application No. 2018-222346 is hereby incorporated herein by reference.

BACKGROUND

Field of the Invention

The present invention relates to a reel braking adjustment device and a reel braking adjustment program.

Background Art

Specifically, in a fishing reel such as a bait casting reel, computer control technology for carrying out spool braking in order to suppress the backlash that occurs during casting is known. As a fishing reel that carries out spool braking by computer control, a fishing reel in which control patterns of spool braking can be changed in accordance with braking force setting information input from an external device is known (for example, refer to Japanese Published Unexamined Application No. 2004-357601).

In the technique disclosed in Japanese Published Unexamined Application No. 2004-357601, the control pattern of spool braking that is changed based on the braking force setting information input from the external device is uniquely determined in advance, although, for example, the type of lure, the required flight of the lure at the end of a cast, etc., are taken into consideration. On the other hand, the casting technique (including user habit) and the preferred flight of the lure differ depending on the user. For this reason, fishing reel behavior corresponding to spool braking that follows a set control pattern is not necessarily preferred by the user. That is, it is difficult to achieve a setting for spool braking of a fishing reel that is in accord with the preferences of each individual user by the technique disclosed in Japanese Published Unexamined Application No. 2014-357601.

SUMMARY

In consideration of the circumstances described above, the object of the present invention is to enable adjustment of the setting for pool braking of a fishing reel so as to be in accord with the preferences of each individual user.

One aspect of the present invention for solving the problem described above is a reel braking adjustment device comprising a tensile force-related information acquisition unit that acquires tensile force-related information, which is information that is related to the tensile force acting on a fishing line and that is detected during a fishing line discharge period in which the fishing line is released or cast from a dual-bearing reel that includes a function for braking the rotation of the spool based on braking parameters, and a braking parameter correction unit that corrects the braking parameters based on temporal changes in the tensile force-related information acquired by the tensile force-related information acquisition unit.

By the configuration described above, it is possible to correct the braking parameters that are set by the function for braking the spool in accordance with the detection result of the tensile force of the fishing line that is released from the spool due to casting. It thereby is possible to achieve a setting for spool braking of a fishing reel that is in accordance with the preferences of each individual user.

Another aspect of the present invention is the reel braking adjustment device described above, wherein the braking parameters include braking strength when braking is activated during the fishing line discharge period. By the configuration described above, it is possible to correct the braking strength appropriately when braking is activated according to the given user.

Another aspect of the present invention is the reel braking adjustment device described above, wherein the braking parameters include the braking timing at which the braking is activated during the fishing line discharge period. By the configuration described above, it is possible to correct the braking timing appropriately according to the given user.

Another aspect of the present invention is the reel braking adjustment device described above, wherein the braking parameter correction unit displays a correction guidance screen that reflects temporal changes in the tensile force-related information and corrects the braking parameters in accordance with an operation that is carried out on the correction guidance screen. By the configuration described above, the user can carry out an operation to appropriately correct the braking parameters while having knowledge of the state of change of the tensile force corresponding to the current setting of the braking parameter.

Another aspect of the present invention is the reel braking adjustment device described above, wherein the braking parameter correction unit corrects the braking parameters in accordance with an operation to specify a parameter value. With the configuration described above, it is possible to precisely correct the braking parameter in accordance with the preferences and intentions of the given user.

Another aspect of the present invention is the reel braking adjustment device described above, wherein the braking parameter correction unit corrects the braking parameter of a specified correction target in response to an operation that is carried out for instructing the execution of a correction specifying the correction target of the braking parameters. With the configuration described above, the braking parameter is corrected by the user specifying the correction target of the braking parameters and carrying out an operation for instructing the execution of the correction. In this embodiment, since the user does not need to carry out an operation for specifying the parameter value for correction, it is possible to simply correct the braking parameter in accordance with the preferences and intentions of the given user.

Another aspect of the present invention is the reel braking adjustment device described above, wherein the braking parameter correction unit corrects the braking parameters in accordance with an operation for instructing the execution of the correction. With the configuration described above, the braking parameter is corrected as long as the user carries out an operation for instructing the execution of the correction. In this embodiment, since the user does not need to carry out an operation to specify the parameter value for correction, it is possible to simply carry out the correction of the braking parameter according to the given user.

Another aspect of the present invention is a reel braking adjustment program, which causes a computer serving as a reel braking adjustment device to function as a tensile force-related information acquisition unit that acquires tensile force-related information, which is information that is related to the tensile force acting on a fishing line that is detected during a fishing line discharge period in which the fishing line is released from a dual-bearing reel that has a function for braking the rotation of the spool based on braking parameters, and a braking parameter correction unit that corrects the braking parameters based on temporal changes in the tensile force-related information acquired by the tensile force-related information acquisition unit.

As described above, according to the present invention, it is possible to adjust the setting for the spool braking of a fishing reel so as to be in accord with the preferences of each individual user.

DETAILED DESCRIPTION OF EMBODIMENTS

First Embodiment

Figure 1:
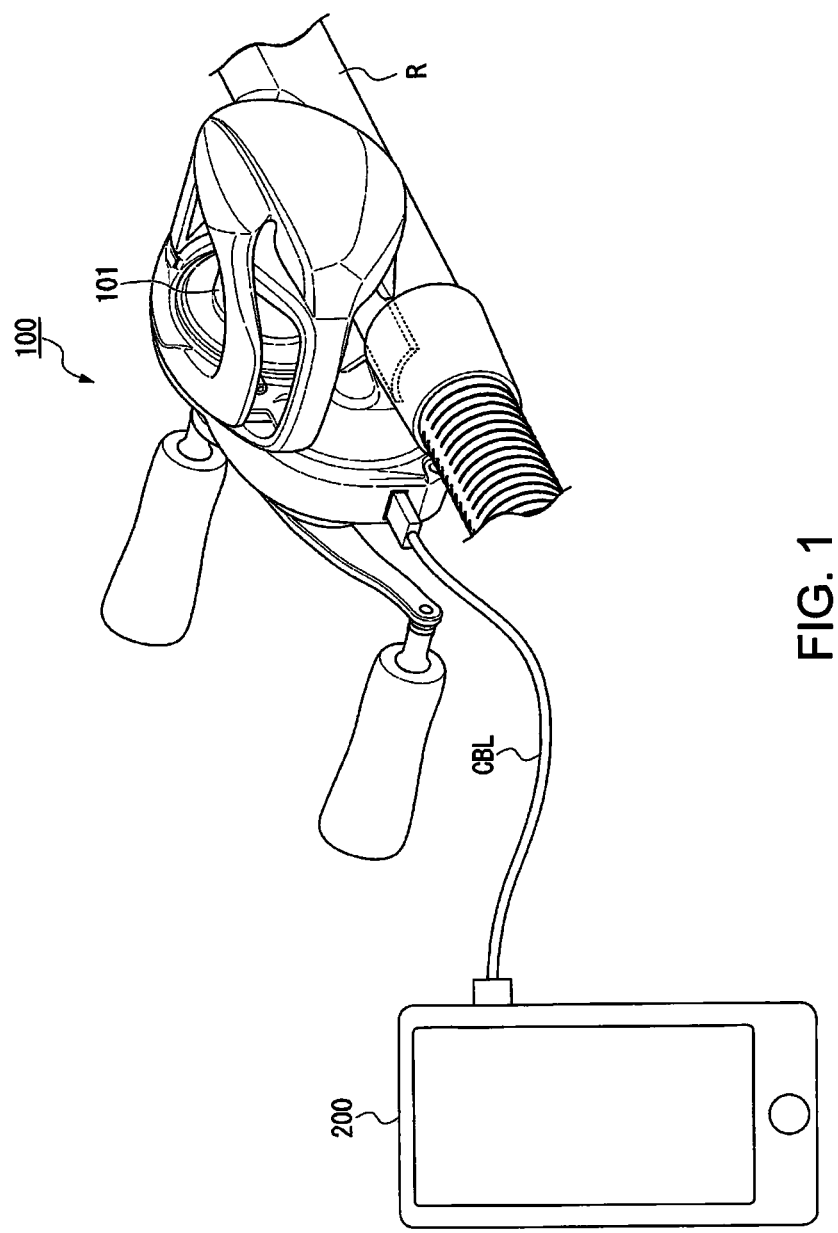
FIG. 1 is a view illustrating an example of a reel braking adjustment system according to an embodiment.

A configuration example of a reel braking adjustment system according to an embodiment will be described with reference to FIG. 1. The reel braking adjustment system of FIG. 1 comprises a bait casting reel 100 and a user terminal device 200 (one example of a reel braking adjustment device).

The bait casting reel 100 is a type of a dual-bearing fishing reel, and is attached to a fishing rod R to enable a user to fish. The bait casting reel 100 is attached to the fishing rod R by mounting the reel on a reel attaching pedestal (reel seat) disposed on the fishing rod R.

The user terminal device 200 is generally the property of the user. The drawing shows an example in which the user terminal device 200 is a mobile terminal device such as a smartphone. However, the user terminal device 200 can be a stationary or laptop personal computer, for example. In the embodiment in which the user terminal device 200 is a smartphone, a personal computer, or the like in this manner, an application corresponding to the reel braking adjustment function (reel braking adjustment application software) is installed in the user terminal device 200.

The user terminal 200 can be, in one embodiment, a dedicated terminal specializing in the reel braking adjustment function of the present embodiment.

The bait casting reel 100 and the user terminal device 200 can be connected via a cable CBL so as to be capable of communicating with each other. In addition, through the connection with the cable CBL, for example, a computer included in the bait casting reel 100 can include power from the user terminal device 200.

In addition, the bait casting reel 100 and the user terminal device 200 can be connected so as to be capable of wireless communication. In this embodiment, for example, the computer included in the bait casting reel 100 can be driven by a battery.

In the bait casting reel 100, when the lure is cast, a spool 101, around which the fishing line is wound, rotates and the fishing line wound around the spool 101 is released. Thus, at the time of casting, for example, backlash of the bait casting reel 100 will occur if the rotational speed of the spool 101 exceeds the speed with which the fishing line is released.

Therefore, the bait casting reel 100 according to the present embodiment is configured to be capable of braking the spool 101 to prevent backlash when the spool 101 rotates due to casting.

In the following description, the braking of the spool 101 can be described as "spool braking," and the computer control related to the spool braking of the bait casting reel 100 can be described as "spool braking control."

Figure 2:
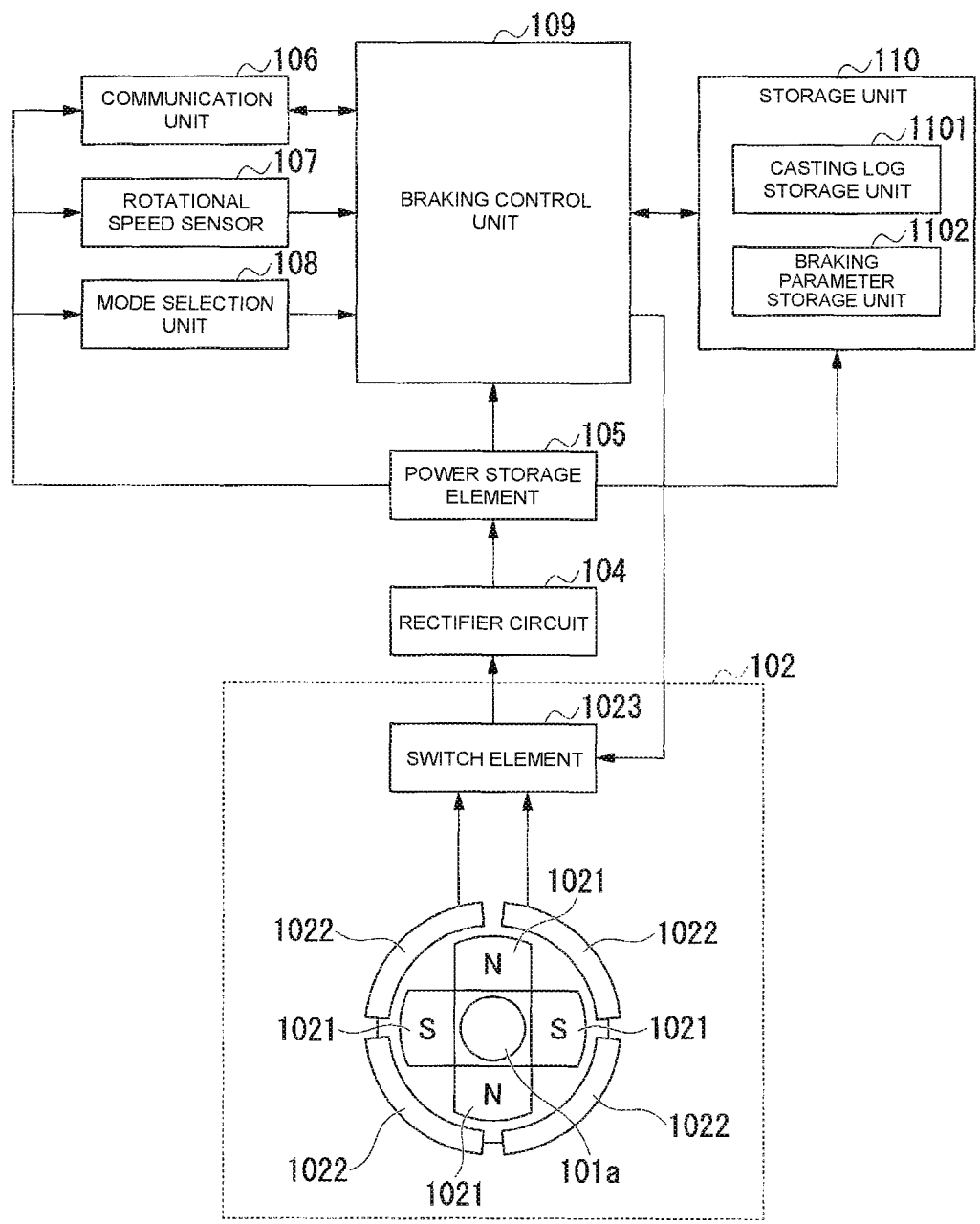
FIG. 2 is a view illustrating an example related to spool braking in a bait casting reel according to the embodiment.

FIG. 2 illustrates an example related to spool braking in the bait casting reel 100.

A spool braking unit 102 is a part that brakes the spool 101. The spool braking unit 102 includes a brake magnet 1021, a plurality of coils 1022 connected in series, and a switch element 1023.

The brake magnet 1021 is disposed on the spool 101 (FIG. 1) so as to be integrally rotatable. Specifically, the brake magnet 1021 can be fixed to a spool shaft 101a of the spool 101. The brake magnet 1021 is a cylindrical magnet, for example, that is magnetized to have polar anisotropy.

The coils 1022 are arranged in a cylindrical shape on the outer perimeter side of the brake magnet 1021 at prescribed intervals. To prevent cogging and to ensure the smooth rotation of the spool 101, the coils 1022 are of a coreless type. Moreover, a yoke is not provided. The coils 1022 are wound in an essentially rectangular shape such that the wound core wire is disposed facing the brake magnet 1021 within the magnetic field of the brake magnet 1021. As shown in FIG. 2, an example is presented in which four coils 1022 are provided. The four coils 1022 are each curved in the form of an arc and formed with a generally cylindrical shape overall. The two ends of the plurality of coils 1022 that are connected in series are connected to the switch element 1023.

The switch element 1023 can include, for example, a field-effect transistor. The switch element 1023 turns the current that is generated by the relative rotation between the brake magnet 1021 and the coils 1022 on and off. A braking control unit (controller) 109 controls the braking of the spool 101 by changing the current on-off time via the duty ratio of the switch element 1023.

The braking force (braking strength) generated by the spool braking unit 102 increases with the on-time of the switch element 1023 (as the duty ratio becomes larger).

The switch element 1023 is connected to a rectifier circuit 104. The rectifier circuit 104 rectifies the voltage corresponding to the current that is turned on and off by the switch element 1023 and outputs the rectified voltage to power storage element 105. That is, the power storage element 105 accumulates the electric power generated in the coils 1022 in accordance with the rotation of the spool 101 during casting. The power storage element 105 can include, for example, an electrolytic capacitor. The electric power that accumulates in the power storage element (storage) 105 is supplied to a communication unit (communicator) 106, a rotational speed sensor 107, a mode selection unit (mode selector) 108, the braking control unit 109, a storage unit (storage) 110, etc.

The communication unit 106 communicates with the user terminal device 200. In correspondence to FIG. 1, the communication unit 106 has a connector for connecting to the cable CBL. In addition, during wireless communication with the user terminal device 200, the communication unit 106 can be capable of communication compatible with a prescribed wireless communication method.

The rotational speed sensor 107 detects the rotational speed of the spool 101. The rotational speed sensor 107 can include, for example, a light-projecting/receiving photoelectric switch having a light-projecting unit and a light-receiving unit. A plurality of slits arranged in the direction of rotation at intervals are formed on the outside surface of a flange portion of the spool 101. With the light-projecting unit and the light-receiving unit, the rotational speed sensor 107 detects the rotational speed of the spool 101 through detection of the light passing through the slits.

The method with which the rotational speed sensor 107 detects the rotational speed of the spool 101 is not particularly limited. In addition, the rotational speed sensor 107 can be disposed in any location in the bait casting reel 100 with which detection of the rotational speed of the spool 101 is possible.

The mode selection unit 108 is provided in order to select any one of a plurality of preset spool braking modes. In the plurality of spool braking modes, different braking strengths and braking timings are set in advance to respectively match, for example, the required lure flight distance, wind conditions, etc.

The braking timing is the timing at which spool braking is activated and can be indicated by, for example, a start timing and an end timing of the spool braking. In addition, the activation of the spool braking during the period in which the fishing line is released as a result of one cast (fishing line discharge period) can be carried out intermittently multiple times, in which situation the braking timing indicates the start timing and the end timing of the spool braking for each spool braking.

In addition, the mode selection unit 108 includes a mode selection operation element for selecting the spool braking mode provided in the bait casting reel 100 and outputs a signal indicating the selected spool braking mode to the braking control unit 109 in accordance with an operation carried out on the mode selection operation element.

The braking control unit 109 executes the control affecting the braking of the spool. The functions of the braking control unit 109 are realized through program execution by a CPU (Central Processing Unit) disposed in the bait casting reel 100.

The braking control unit 109 sets the spool braking mode in accordance with the signal output from the mode selection unit 108. The braking control unit 109 carries out the spool braking control corresponding to the spool braking mode by controlling the on-off time of the switch element 1023 based on a braking parameter corresponding to the spool braking mode that has been set. The braking parameter used by the braking control unit 109 is stored in a braking parameter storage unit 1102.

In addition, the braking control unit 109 detects the tensile force that acts on the fishing line that is released from the spool 101 during casting. The tensile force can be obtained from a change rate ($\Delta\omega/\Delta t$) of the rotational speed of the spool 101 and the moment of inertia J. The rotational speed of the spool 101 changes during the period in which the fishing line is released due to casting. The difference between this rotational speed and a hypothetical rotational speed for the case in which the spool 101 is assumed to be rotating freely and independently without receiving the tensile force from the fishing line is caused by a rotational drive force (driving torque) generated due to the tensile force from the fishing line. The driving torque can be obtained by multiplying the rate of change ($\Delta w/\Delta t$) of the rotational speed and the moment of inertia of the spool 101. The braking control unit 109 can calculate (detect) the tensile force based on, for example, the driving torque obtained in this manner and the radius from the line of action of the fishing line.

The braking control unit 109 stores, in a casting log storage unit 1101, a casting log that includes tensile force data (tensile force log) that is detected at regular intervals, for example, during the fishing line discharge period corresponding to each cast.

The storage unit 110 stores information related to spool braking. The storage unit 110 can include nonvolatile memory disposed in, for example, the bait casting reel 100. Examples of the nonvolatile memory include flash memory.

As illustrated in FIG. 2, the storage unit 110 includes the casting log storage unit 1101 and the braking parameter storage unit 1102.

The casting log storage unit 1101 stores the casting log corresponding to each cast. The casting log is log data that includes one or more data items recorded in association with the corresponding cast.

The braking parameter storage unit 1102 records the braking parameters that the braking control unit 109 uses for the spool braking control. The braking parameter storage unit 1102 records the braking parameters corresponding to each spool braking mode. In addition, the braking parameters corresponding to one spool braking mode includes the timing at which the spool braking is activated during the fishing line discharge period (braking timing) and the braking strength during the period in which the braking is activated.

An example of a configuration of the user terminal device 200 will be described with reference to FIG. 3. The user terminal device 200 in FIG. 3 comprises a communication unit (communicator) 201, a control unit (controller) 202, a display unit (display) 203, an operating unit (operator) 204, and a storage unit (storage) 205.

The communication unit 201 communicates with the communication unit 106 of the bait casting reel 100. In correspondence to FIG. 1, the communication unit 201 has a connector for connecting to the cable CBL. In addition, during wireless communication with the bait casting reel 100, the communication unit 201 is capable of communication compatible with a prescribed wireless communication method.

The control unit 202 executes control that affects the adjustment of reel braking according to the present embodiment. This function of the control unit 202 is realized through the execution of a program by the CPU disposed in the user terminal device 200. In the embodiment in which the user terminal device 200 is a smartphone, a personal computer, etc., this function of the control unit 202 is realized by the installation of a program serving as reel braking adjustment application software.

Figure 3:
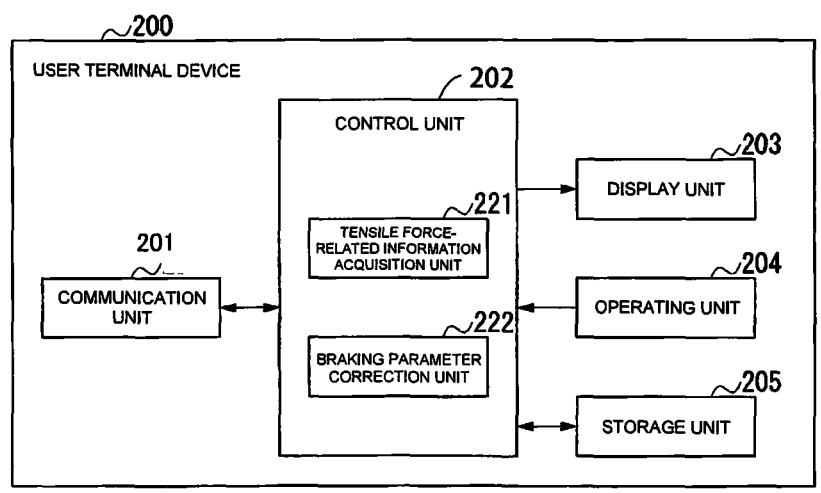
FIG. 3 is a view illustrating an example of a user terminal device according to the embodiment.

The control unit 202, as shown in FIG. 3 includes a tensile force-related information acquisition unit (force-related information acquirer) 221 and a braking parameter correction unit (braking parameter corrector) 222.

The tensile force-related information acquisition unit 221 acquires information related to the tensile force that acts on the fishing line (tensile force-related information) detected during the fishing line discharge period in which the fishing line is released from the spool 101 of the bait casting reel 100. Specifically, the tensile force-related information acquisition unit 221 according to the present embodiment acquires the tensile force log included in the casting log recorded in the casting log storage unit 1101 of the bait casting reel 100 as the tensile force-related information.

The braking parameter correction unit 222 corrects the braking parameters based on temporal changes in the tensile force-related information acquired by the tensile force-related information acquisition unit 221. Specifically, the braking parameter correction unit 222 estimates temporal changes in the tensile force during the fishing line discharge period based on the tensile force information (tensile force log) acquired by the tensile force-related information acquisition unit 221. The tensile force log acquired by the tensile force-related information acquisition unit 221 indicates the tensile force associated with each time period (time) during the fishing line discharge period corresponding to one cast. The tensile force-related information acquisition unit 221 can be configured to acquire the tensile force for each time period during the fishing line discharge period indicated by the tensile force log as the estimation result of the change in the tensile force. The correction of the braking parameters by the braking parameter correction unit 222 will be described further below.

The display unit 203 carries out a display in accordance with control by the control unit 202.

The operating unit 204 collectively indicates operating elements, such as buttons, disposed in the user terminal device 200, operating devices disposed in the user terminal device 200, operating devices that are connected to the user terminal device 200, etc. For example, if the display unit 203 is a touch panel, the operating unit 204 includes devices such as a touchpad that constitute the touch panel.

The storage unit 205 stores various data corresponding to the user terminal device 200.

Next, the adjustment of the braking parameters in the present embodiment will be described.

The bait casting reel 100 according to the present embodiment is capable of setting the spool braking mode selected according to a user operation of the mode selection operation element, as described above. The user can thereby carry out casting by setting the most appropriate spool braking mode in accordance with, for example, the type of lure and the conditions at the given time, the user's casting habits, etc.

However, the braking parameters corresponding to each of the spool braking modes are those in which the parameter values that are determined to be standard parameter values by, for example, the manufacturer of the bait casting reel 100, are set in a fixed manner.

On the other hand, users have their own particular casting habits. Such casting habits generally differ from user to user. For this reason, even if spool braking is carried out using the same braking parameters, some users can experience, for example, backlash due to low braking force, while other users can feel that the braking force is too high and reduces flight distance.

In this manner, even if the braking parameters are set in accordance with each of the spool braking modes, it is difficult to match the behavior of the bait casting reel 100 to each individual user. For this reason, as a matter of course, cases occur in which the behavior of the bait casting reel 100, such as the state of the release of the fishing line according to the set braking parameter, does not suit the user.

As discussed above in Japanese Published Unexamined Application No. 2014-357601, a technique for changing the control pattern of the spool braking based on the braking force setting information input from an external device is known. However, if such a technique is applied to the present embodiment, for example, the braking parameters set by the manufacturer will be overwritten by braking parameters using different parameter values. In this situation, the changed braking parameters are, in the end, also those in which the parameter values that are determined to be standard from a perspective different from that of the manufacturer are set in a fixed manner. Accordingly, even with the technique disclosed in Japanese Published Unexamined Application No. 2014-357601, it is difficult to match the behavior of the bait casting reel 100 with the sense of each individual user, in the same manner as the situation in which the manufacturer sets the braking parameters.

Therefore, the present embodiment is configured such that the user can change and adjust the braking parameters to match the user's own sense by operating the user terminal device 200.

Figure 4:
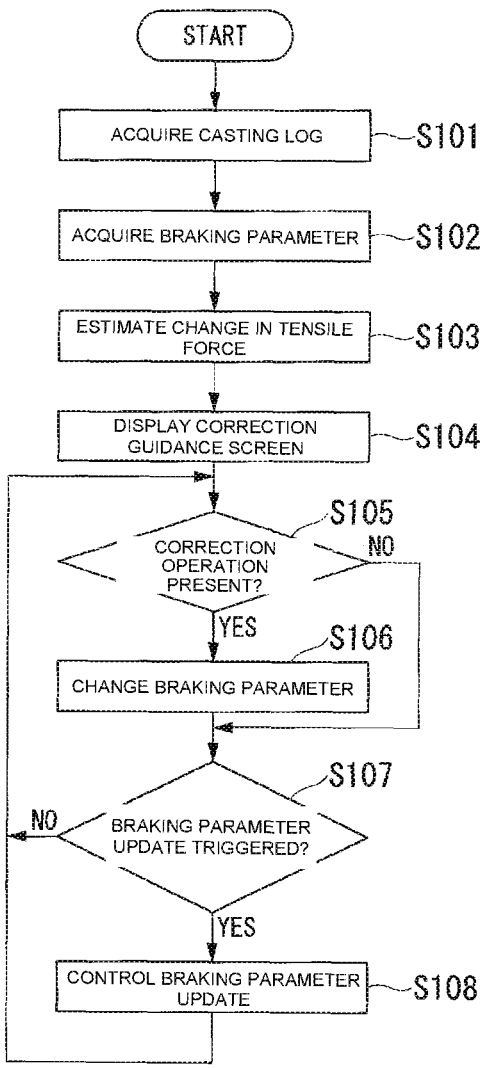
FIG. 4 is a flowchart illustrating an example of a process procedure executed by the user terminal device in relation to an adjustment of a braking parameter according to the embodiment.

The flowchart of FIG. 4 illustrates an example of a processing procedure executed by the user terminal device 200 in relation to the adjustment of the braking parameters.

Step S101: When the braking parameters are adjusted, first, the user connects the user terminal device 200 and the bait casting reel 100 so that they are capable of communicating with each other. Then, the user carries out an operation to cause the user terminal device 200 to acquire the casting log stored in the casting log storage unit 1101 of the bait casting reel 100 by operating the user terminal device 200.

The casting log stored in the casting log storage unit 1101 is presented in list form on an operating screen (braking parameter acquisition screen) that is displayed on the user terminal device 200 in response to an operation for acquiring the braking parameters, for example. In such a braking parameter acquisition screen, the date and time that the casting was carried out (casting date and time), the spool braking mode that was set at the time of casting, and the like can be indicated for each list item of the casting log as the heading for the corresponding cast. In this embodiment, the casting log can include, in addition to the tensile force log, information such as the casting date and time, the corresponding spool braking mode, and the like.

The user selects the list items of the casting log to be acquired by the user terminal device 200 from among the list items of the presented casting log, and then carries out an operation (casting log acquisition instruction operation) to instruct the execution of the acquisition.

With an operation of the user terminal device 200, the tensile force-related information acquisition unit 221 causes the display unit 203 to display the braking parameter acquisition screen 203 described above. In addition, the tensile force-related information acquisition unit 221 acquires the casting log corresponding to the selected list items from the casting log storage unit 1101 in accordance with the casting log acquisition instruction operation that is carried out on the displayed braking parameter acquisition screen.

Step S102: In addition, the tensile force-related information acquisition unit 221 acquires the braking parameters corresponding to the spool braking mode indicated in the casting log acquired in Step S101 from the braking parameter storage unit 1102 of the bait casting reel 100.

The braking parameter correction unit 222 stores the acquired braking parameters in a RAM disposed in the control unit 202, for example.

Step S103: The braking parameter correction unit 222 uses the tensile force log included in the casting log acquired in Step S101 to estimate the changes in the tensile force during the fishing line discharge period at the time of casting corresponding to the acquired casting log.

Step S104: The braking parameter correction unit 222 causes the display unit 203 to display the correction guidance screen reflecting the changes in the tensile force estimated in Step S103.

Figure 5:
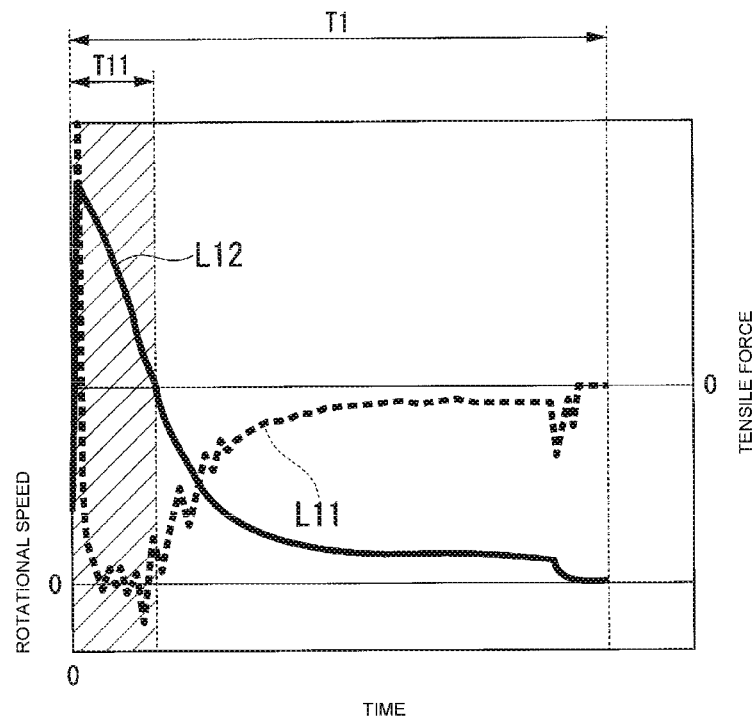
FIG. 5 is a view illustrating one example of changes in the tensile force presented in a tensile force change presentation area according to the embodiment.

For example, a tensile force change presentation area, which indicates the temporal change in tensile force L11 during the fishing line discharge period T1, is arranged in the correction guidance screen, in the manner shown in FIG. 5. In addition, in FIG. 5, the temporal change in rotational speed L12 of the spool 101 during the fishing line discharge period T1 is shown together with the change in tensile force L11.

The braking parameter correction unit 222 can display the change in tensile force L11 based on the tensile force log included in the casting log acquired in Step S101.

In addition, when the change in rotational speed L12 is also shown, as in FIG. 5, the rotational speed of the spool associated with the time (set time period) during the fishing line discharge period T1 in the casting log is also included. In addition, the braking parameter correction unit 222 causes a display to appear based on the rotational speed of the spool included in the casting log acquired in Step S101. Alternatively, the braking parameter correction unit 222 can calculate the rotational speed of the spool 101 based on the tensile force indicated by the tensile force log and the moment of inertia of the spool 101 of the bait casting reel 100. In this embodiment, the moment of inertia of the spool 101 can be acquired, for example, from the bait casting reel 100 or from reel braking adjustment application software stored in the user terminal device 200 for this purpose.

In addition, as shown in FIG. 5, an activation period T11 in which spool braking is activated during the fishing line discharge period T1 is shown as a band.

Step S105: The braking parameter correction unit 222 determines whether an operation to correct the braking parameter has been carried out by the user in a state in which the correction guidance screen is displayed.

Step S106: If an operation to correct the braking parameter has been carried out, the braking parameter correction unit 222 changes the parameter value of the braking parameter stored in the RAM to the value specified by the operation.

Here, an example of the braking parameter correction operation carried out by the user will be described.

Figure 6:
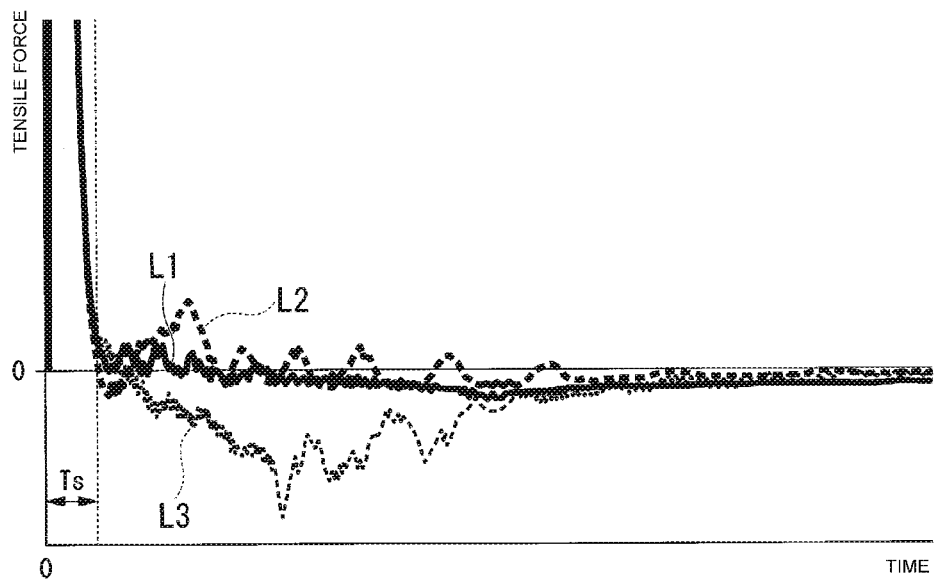
FIG. 6 is a view illustrating an example of changes in the tensile force according to the embodiment.

FIG. 6 illustrates three patterns as examples of changes in the tensile force during the fishing line discharge period. Of the three patterns of changes in tensile force shown in the figure, the change in tensile force L1 is a pattern in which a value close to "0" is obtained after the lapse of a release start period Ts, in which the release of the fishing line is initially started during the fishing line discharge period. The change in tensile force L1 such as the foregoing corresponds to a state in which backlash is sufficiently suppressed in the bait casting reel 100, and sufficient lure flight distance is achieved, since braking is not being applied excessively. That is, it is a state in which spool braking is functioning appropriately in terms of strength, timing, etc.

In addition, in a change in tensile force L2, after the lapse of the release start period Ts, there tends to be many timings at which the value is greater than "0" by at least a certain amount. The change in tensile force L2 such as the foregoing corresponds to a state in which the braking strength is high. the case of such a state, although the generation of backlash is sufficiently suppressed, the braking strength is inappropriate in that a sufficient lure flight distance cannot be achieved.

In addition, with respect to a change in tensile force L3, there is a tendency, after the lapse of the release start period Ts, for the value to be smaller than "0" by at least a certain amount. Such a change in tensile force L3 corresponds to a state in which the braking strength is low. In this embodiment, although the influence on the flight distance due to excessive braking is sufficiently small, the braking strength is inappropriate in that backlash is more readily generated.

In a similar manner to the change in tensile force L3 shown in FIG. 6, the change in tensile force L11 illustrated in FIG. 5 corresponds to a state in which the braking strength is low, since there is a tendency for the value to be smaller than "0" after the release start period.

For example, if the user feels that backlash tends to occur, it is possible for the user to ascertain that the cause is low spool braking strength by viewing the state of the tensile force change presentation area shown in FIG. 5.

In addition, although it is not shown, a braking parameter operation area, in which it is possible to carry out an operation to change the parameter values of the braking parameters acquired in Step S102, can be arranged in the correction guidance screen. For example, if the braking parameters are the two parameters "braking timing" and "braking strength" at the timing at which braking is effective, the "braking timing," the "braking strength," and the current parameter values of each are indicated in the braking parameter operating area in a prescribed manner. The "braking timing" indicates, for example, the start timing and the end timing as the parameter values.

In this embodiment, the user carries out an operation in the braking parameter operating area to correct the parameter value of the braking strength to be increased to the desired value. In addition, for example, if the user wants to delay the end timing of the period during which spool braking is effective in order to suppress backlash, the user can carry out an operation in the braking parameter operating area to correct the end timing of the braking timing to be delayed by a prescribed period of time. In this manner, the parameter values of the braking parameters in the braking parameter operating area are changed to corrected values in accordance with an operation by the user to correct parameter values of the braking parameters.

Step S107: After the process of Step S106, or if it is determined in Step S105 that an operation to correct the braking parameter is not carried out, the braking parameter correction unit 222 determines whether a braking parameter update trigger has occurred.

The change in the braking parameter in Step S106 is with respect to the braking parameter acquired and stored in the RAM in Step S102. Accordingly, the change in the braking parameter in Step S106 is still not reflected on the bait casting reel 100 side. For this reason, in order to reflect the braking parameter changed due to the operation to correct the braking parameter on the bait casting reel 100, it is necessary to update the braking parameter stored in the braking parameter storage unit 1102 of the bait casting reel 100 with the braking parameter stored in the RAM. The braking parameter update trigger is a trigger that instructs the braking parameter correction unit 222 to update the braking parameter in the braking parameter storage unit 1102.

The braking parameter update trigger occurs in accordance with a braking parameter update instruction operation carried out by the user. The braking parameter update instruction operation can be, for example, the operation of a prescribed button arranged in the correction guidance screen.

Step S108: If it is determined that the braking parameter update trigger occurred in Step S107, the braking parameter correction unit 222 executes control to update the braking parameter stored in the braking parameter storage unit 1102 of the bait casting reel 100. Specifically, the braking parameter correction unit 222 can transmit a braking parameter update request including the braking parameter currently stored in the RAM from the communication unit 201 to the bait casting reel 100.

In the bait casting reel 100, the braking control unit 109 updates the braking parameter stored in the braking parameter storage unit 1102 with the braking parameter included in the braking parameter received by the communication unit 106.

If it is determined that the braking parameter update trigger has not occurred in Step S107, or, after the process of Step S108, the process returns to Step S105. The user can thereby repeatedly carry out operations to correct the braking parameters.

The braking parameter update trigger can be configured to also occur when the change in the braking parameter due to Step S106 is still not reflected on the bait casting reel 100, when the reel braking adjustment application software is ended or transitions to a background state. It is thereby possible to reflect the parameter value of the braking parameter that the user corrected last on the bait casting reel 100, even when, for example, the user quits the reel braking adjustment application software or places the application software in the background, without carrying out the braking parameter update instruction operation.

For example, with respect to the behavior of the bait casting reel 100 illustrated in FIG. 5, it is assumed that the user corrects the braking parameter so as to suppress backlash and updates the braking parameter of the bait casting reel 100 with the corrected braking parameter, as described above.

Figure 7:
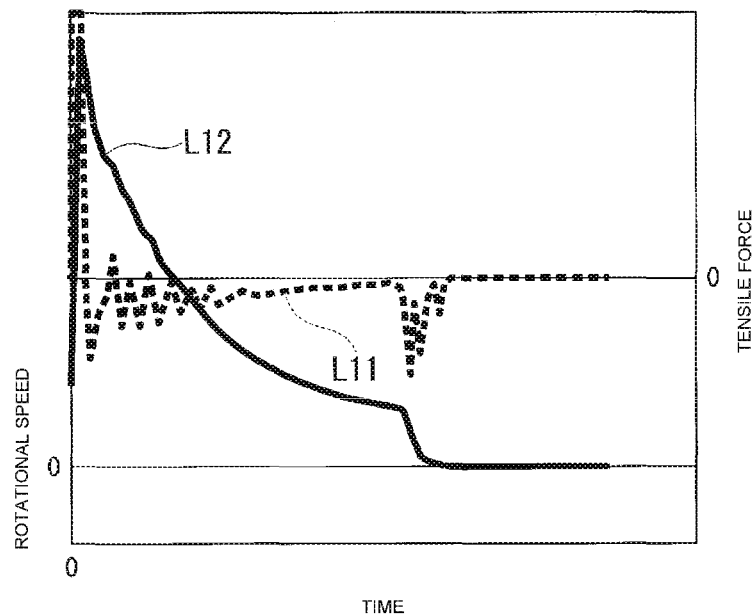
FIG. 7 is a view illustrating an example of changes in the tensile force corresponding to braking parameter correction according to the embodiment.

Thereafter, for example, if the correction guidance screen is displayed based on the casting log of when the user carried out casting with the bait casting reel 100, the change in tensile force L11 (and the rotational speed change L12) in the tensile force change presentation area of the correction guidance screen changes as shown in FIG. 7. That is, the change in tensile force L11 is a value close to "0" after the release start period, which is a state in which backlash is sufficiently suppressed and there is virtually no loss of flight distance.

The braking parameter correction unit 222 can simulate the changes in the tensile force, the rotational speed, etc., that would occur during casting with the settings of the changed braking parameters in response to the user carrying out an operation to change the braking parameters. The simulation can be, for example, carried out based on the relationship between an increase/decrease rate of the tensile force and a rate of change rate of the braking parameter set in advance.

The simulation result can then be displayed on the correction guidance screen. The simulation result can be displayed in the manner shown in FIG. 7.

In the foregoing description, an example of a situation is presented in which the user corrects the braking parameters from the point of view that it is preferable for the change in tensile force at the time of casting during the fishing line discharge period to be corrected to approach "0" as much as possible.

However, in the present embodiment, the user need only correct the braking parameters such that the behavior of the bait casting reel 100 at the time of casting matches the user's own preferences.

For example, there are situations in which some users prefer that the spool braking not be too high, even if this results in a certain degree of backlash. In this situation, the user can correct the braking parameters such that it results in a change in tensile force that approaches a prescribed value smaller than "0" in order to match the user's preferences rather than in a change in tensile force that approaches "0" as much as possible.

Conversely, there are situations in which some users prefer bait casting reel 100 behavior in which backlash is reliably suppressed, even if the flight distance is sacrificed to some extent. In this situation, the user can correct the braking parameters such that there results a change in tensile force that approaches a prescribed value larger than "0" in order to match the user's preferences.

That is, in the present embodiment, the user can correct the braking parameters to match his or her own preferences. Thus, since it is possible for the user to ascertain the behavior of the bait casting reel 100, when casting using the settings of the current braking parameters, from the change in tensile force indicated in the tensile force change presentation area, the user can accurately make a correction at the time the correction is executed that matches his or her own preferences.

Second Embodiment

Next, a second embodiment will be described. In the first embodiment, the correction of the braking parameters is achieved by the user carrying out an operation to change the parameter values of the braking parameters. In this embodiment, precise correction is possible. On the other hand, some users desire to carry out corrections with a simple operation as long as the behavior of the bait casting reel 100 approaches the user's preference to a certain extent without finely adjusting the settings. Therefore, in the present embodiment, the braking parameters can be corrected by a simple operation.

Figure 8:
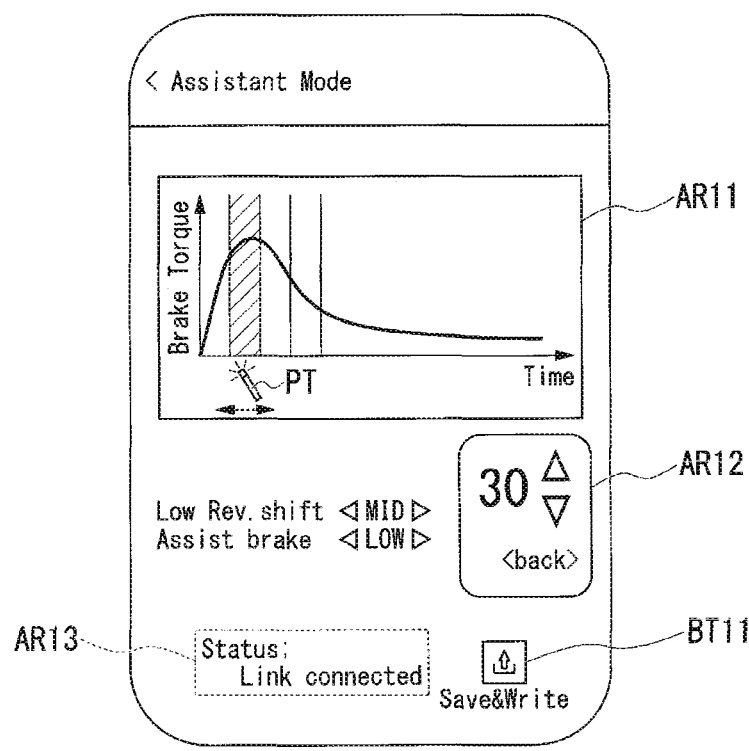
FIG. 8 illustrates an example of a correction guidance screen according to a second embodiment.

FIG. 8 illustrates an example of a correction guidance screen displayed on the display unit 203 of the user terminal device 200 according to the second embodiment. The correction guidance screen in FIG. 8 shows an example of an embodiment in which operation is possible by the user bringing a part of the body, such as a finger, into contact with the display surface of the display unit 203 when the display unit 203 is a touch panel.

As shown in FIG. 8, a braking torque presentation area AR11, a parameter value changing area AR12, a status area AR13, and an update instruction button BT11 are arranged in the correction guidance screen.

The braking torque presentation area AR11 is an area that indicates the changes in the braking torque of the spool braking during the fishing line discharge period that are derived in correspondence with the changes in tensile force estimated by the braking parameter correction unit 222.

As the braking torque increases, the tensile force at the corresponding time increases, and as the braking torque decreases, the tensile force at the corresponding time decreases. The user can ascertain how the tensile force changed during the fishing line discharge period by viewing the change in braking torque in the braking torque presentation area AR11.

In addition, in the braking torque presentation area AR11, a braking strength evaluation display indicating a result of evaluating the braking strength of the spool braking is carried out. As a specific example, the braking parameter correction unit 222 evaluates the braking strength during the fishing line discharge period as belonging to one of three levels: "appropriate," "high," or "low." Such an evaluation of the braking strength corresponding to the braking strength display can be executed by the braking parameter correction unit 222 based on the degree of divergence of the change in tensile force relative to a preset standard change in tensile force (standard value of the tensile force at each time during the fishing line discharge period).

The braking parameter correction unit 222 then displays the time period (fishing line discharge period) indicated in the braking torque presentation area AR11 divided into three types of evaluation intervals: an evaluation interval in which the braking strength is determined to be high, an evaluation interval in which the braking strength is determined to be appropriate, and an evaluation interval in which the braking strength is determined to be low.

In the braking torque presentation area AR11, the evaluation interval in which the braking strength is determined to be high indicates that it is an interval in which the tensile force is above the appropriate range; the evaluation interval in which the braking strength is determined to be appropriate indicates that it is an interval in which the tensile force is within the appropriate range; and the evaluation interval in which the braking strength is determined to be low indicates that it is an interval in which the tensile force is below the appropriate range.

For example, by applying a different prescribed color for each of the three types of evaluation intervals, the user can visually distinguish between the three types of evaluation intervals. As a specific example, color-coding can be set such that the evaluation interval in which the braking strength is determined to be high is red, the evaluation interval in which the braking strength is determined to be appropriate is green, and the evaluation interval in which the braking strength is determined to be low is blue.

The number of sections of the evaluation intervals corresponding to the braking strength is not particularly limited. For example, each of the evaluation intervals in which the braking strength is determined to be high and the evaluation interval in which the braking strength is determined to be low can be further classified in accordance with the braking strength. In this embodiment, for example, the interval further classified within the evaluation interval in which the braking strength is determined to be high can be set such that the red color becomes darker in a stepwise manner as the braking strength increases. In addition, the interval classified as within the evaluation interval in which the braking strength is determined to be low can be set such that the blue color becomes lighter in a stepwise manner as the braking strength decreases.

By viewing the braking strength evaluation display that is configured in the manner described above, the user can intuitively ascertain the behavior of the bait casting reel 100 in terms of the appropriate braking strength when the user casts using the current setting of the braking parameters.

The parameter value changing area AR12 is an area in which operations to change the values (parameter values) of the braking parameters are carried out.

The status area AR13 is an area for creating a display indicating the connection state between the user terminal device 200 and the bait casting reel 100.

The update instruction button BT11 is a button for executing the braking parameter update instruction operation.

By the correction guidance screen of this embodiment, the user can correct the braking parameters by either a simple manual correction or a semi-automatic correction.

A simple manual correction is a correction of the braking parameters carried out by the user specifying the evaluation interval to be corrected during the fishing line discharge period, and then carrying out an operation to change the parameter value of the braking strength in the specified evaluation interval. In this case, the braking timing is not arbitrarily specified by the user, but can be selected from the evaluation interval, so that the correction procedure is simplified in this respect.

In the semi-automatic correction, in response to the user carrying out an operation to specify the evaluation interval to be corrected in the fishing line discharge period, the user terminal device 200 corrects the parameter value of the braking strength in the specified evaluation interval to a value (automatic correction value) based on the change in tensile force that is set in advance as a standard value.

When carrying out either the simple manual correction or the semi-automatic correction, the user carries out an operation (interval specifying operation) to specify the evaluation interval to be corrected. The interval specifying operation is carried out as an operation on a pointer PT arranged on a graph displayed in the braking torque presentation area AR11. The pointer PT can be operated to move along time axis (horizontal axis) of a graph of the braking torque in the braking torque presentation area AR11. Such an operation to move the pointer PT can be, for example, a swiping operation in which the finger is moved in the lateral direction while touching the pointer PT. In the braking torque presentation area AR11, the form of the display can be changed so that the evaluation interval specified as the correction target can be distinguished from the other evaluation intervals.

When carrying out the simple manual correction, the user carries out the interval specifying operation described above, and thereafter carries out the operation to change the parameter value of the braking strength in the evaluation interval specified as the correction target by an operation in the parameter value changing area AR12. The example in the figure shows the manner in which the parameter value of the braking strength can be increased and decreased by operating an up button and a down button provided in the parameter value changing area AR12. In addition, the current parameter value of the braking strength is displayed in the parameter value changing area AR12.

In addition, when carrying out the semi-automatic correction, the user carries out the interval specifying operation described above, and thereafter carries out a tapping operation on the pointer PT positioned below the evaluation interval to be corrected, as the operation to instruct changing the braking strength to the automatic correction value. In response to the execution of this tapping operation, the braking parameter correction unit 222 carries out the semi-automatic correction in which the braking parameter of the evaluation interval specified as the correction target is set to the automatic correction value.

The semi-automatic correction in which the braking strength is set to the automatic correction value can be carried out as follows. For example, the braking parameter correction unit 222 sets the state in which the change in tensile force after the release start period continues to be "0" as a standard change in tensile force. Then, the braking parameter correction unit 222 changes the parameter value of the braking strength so that the estimated change in tensile force approaches the standard change in tensile force as much as possible.

In this manner, in the semi-automatic correction, the user terminal device 200 changes the braking strength in the evaluation interval to the automatic correction value merely by the user specifying the evaluation interval to be corrected with the pointer PT and carrying out a tapping operation. However, since the automatic correction value obtained in this manner only corresponds to the change in tensile force that is set in advance as a standard value, the automatic correction value does not necessarily match the user's casting as is. In this situation, the user can, for example, further make a simple manual correction to match the user's casting.

As described above, when the braking parameters are changed by the simple manual correction or the semi-automatic correction, the user operates the update instruction button BT11 to set the changed braking parameters in the bait casting reel 100. In response to the operation of the update instruction button BT11, the user terminal device 200 executes a control to update the corresponding braking parameters stored in the braking parameter storage unit 1102 of the bait casting reel 100 with the braking parameters stored in the RAM.

Figure 9:
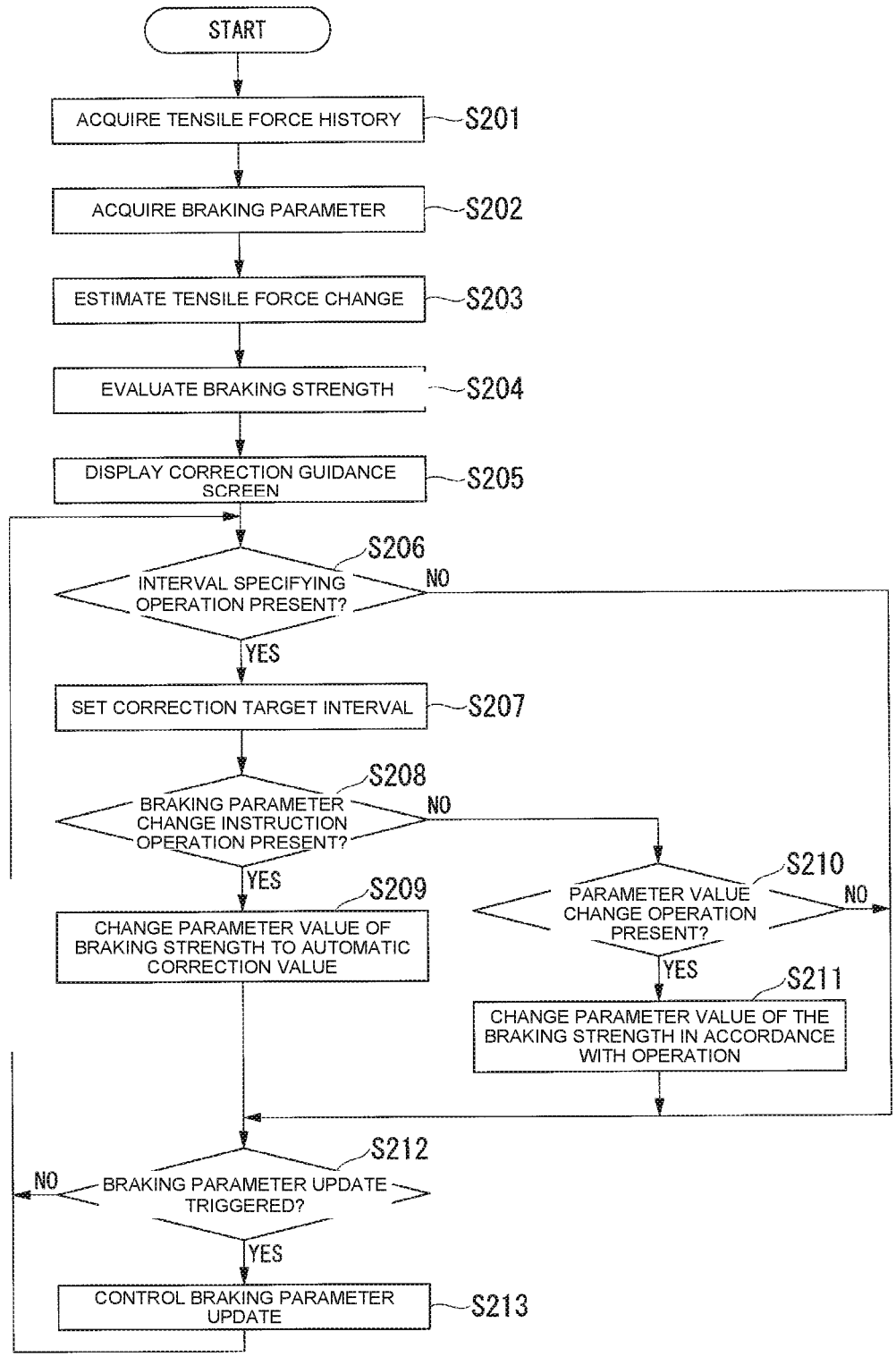
FIG. 9 is a flowchart illustrating an example of a processing procedure executed by the user terminal device in relation to an adjustment of the braking parameter according to the embodiment.

The flowchart of FIG. 9 illustrates an example of a processing procedure executed by the user terminal device 200 in relation to the adjustment of the braking parameters according to the present embodiment. The process of Steps S201 to S203 can be the same as Steps S101 to S103 in FIG. 4.

Step S204: The braking parameter correction unit 222 evaluates the braking strength during the fishing line discharge period based on the change in tensile force estimated in Step S103. The braking parameter correction unit 222 obtains the evaluation result of dividing the fishing line discharge period into evaluation intervals corresponding to the evaluation of the braking strength, as described above.

Step S205: The braking parameter correction unit 222 displays the correction guidance screen in the form illustrated in FIG. 8 on the display unit 203. At this time, the braking parameter correction unit 222 is configured such that the evaluation intervals are shown on the graph in the braking torque presentation area AR11.

Step S206: the braking parameter correction unit 222 determines whether the interval specifying operation has been carried out by the user in a state in which the correction guidance screen is being displayed.

Step S207: If it is determined that the interval specifying operation has been carried out in Step S206, the braking parameter correction unit 222 sets the evaluation interval specified by means of the interval specifying operation as the interval to be corrected in the fishing line discharge period.

Step S208: After the process of Step S207, the braking parameter correction unit 222 determines whether an operation to instruct the braking parameter to be changed to the automatic correction value has been carried out. The operation to instruct the braking parameter to be changed to the automatic correction value is the tapping operation on the pointer PT.

Step S209: If it is determined in Step S208 that the operation to instruct the parameter value of the braking strength to be changed to the automatic correction value has been carried out, then this is interpreted to mean that the semi-automatic correction has been instructed. Therefore, the braking parameter correction unit 222 in this embodiment changes the parameter value of the braking strength to the automatic correction value. That is, the braking parameter correction unit 222 changes the parameter value of the braking strength such that, for example, the change in tensile force estimated in Step S203 becomes closest to the change in tensile force that is set in advance as standard.

Step S210: If it is determined in Step S208 that the operation to instruct the parameter value of the braking strength to be changed to the automatic correction value has not been carried out, the braking parameter correction unit 222 determines whether an operation to change the parameter value has been carried out in the parameter value changing area AR12.

Step S211: If it is determined in Step S210 that an operation to change the parameter value has been carried out in the parameter value changing area AR12, the braking parameter correction unit 222 executes the following process as the manual correction. That is, the braking parameter correction unit 222 changes the parameter value of the braking strength in accordance with the specification by the operation on the parameter value changing area AR12.

After the process of Step S209 or Step S211, or if it is determined in Step S206 that the interval specifying operation has not been carried out, the process of Step S212 is executed.

The processes of Steps S212 and S213 are the same as those of Steps S107 and S108 in FIG. 4. If, in Step S212, it is determined that the braking parameter update has not been triggered, or after the process of Step S213, the process returns to Step S206, and the user can thereby redo the correction of the braking parameter by the simple manual correction or the semi-automatic correction.

The second embodiment is configured such that the correction of the braking parameters is possible by either the simple manual correction or the semi-automatic correction, but the correction of the braking parameters can also be carried out by means of a fully automatic correction.

In the fully automatic correction, a correction is carried out to change the braking strength to the automatic correction value such that the change in tensile force in each evaluation interval during the fishing line discharge period becomes closest to the standard change in tensile force, in response to, for example, the user's carrying out of an operation to instruct the execution of an automatic correction. This type of the fully automatic correction can be carried out, for example, by arranging a fully automatic correction execution instruction button on the correction guidance screen, and can be executed in response to an operation on the fully automatic correction execution instruction button.

Moreover, the fully automatic correction can be carried out, for example, by correcting the braking timing to the automatic correction value according to a prescribed algorithm, and then correcting the braking strength at the timing at which the spool braking is effective to the automatic correction value at the changed braking timing.

In addition, the second embodiment can be configured such that manual correction for changing the braking timing and the braking strength is possible in accordance with an operation by the user, as in the first embodiment.

Modified examples of the present embodiment will now be described.

As modified example of each of the embodiments described above, a user template used for biometric authentication can be associated and stored, together with the corrected braking parameters, in the braking parameter storage unit 1102 of the bait casting reel 100.

In the present modified example, a biometric information sensor for acquiring biometric information as a template for biometric authentication is disposed in the user terminal device 200. In addition, a biometric information sensor for acquiring biometric information used for biometric authentication is disposed in the bait casting reel 100. The method of biometric authentication in the present embodiment is not particularly limited, and a prescribed method such as fingerprint authentication, iris authentication, vein authentication, and voiceprint authentication can be employed.

When the braking parameters stored in the braking parameter storage unit 1102 of the bait casting reel 100 are updated with the braking parameters corrected by the user terminal device 200, the user causes the biometric information sensor of the user terminal device 200 to acquire the biometric information. When the updating of the braking parameters stored in the braking parameter storage unit 1102 is controlled, the user terminal device 200 transmits the acquired biometric information, together with the braking parameters changed by the correction, to the bait casting reel 100. When the braking parameters stored in the braking parameter storage unit 1102 are updated with the received braking parameters, the bait casting reel 100 causes the braking parameter storage unit 1102 to store the updated braking parameters with the received biometric information associated therewith.

Then, when the user fishes using the bait casting reel 100, the user causes the biometric information sensor of the bait casting reel 100 to acquire the biometric information of the user. The braking control unit 109 of the bait casting reel 100 reads the braking parameters with which a template that matches the biometric information acquired by the biometric information sensor is associated from the braking parameter storage unit 1102. The braking control unit 109 executes the control of the spool braking with the read braking parameter.

With such a configuration, in a situation in which a single bait casting reel 100 is used by a plurality of users, it is possible to carry out spool braking with the braking parameters that correspond to each individual user that fish with the bait casting reel 100.

In each of the embodiments described above, the change in tensile force is displayed on the correction guidance screen, and the correction is carried out based on the displayed change in tensile force. However, as a modified example, it is possible to cause the correction to be carried out based on the rotational speed of the spool that is displayed on the correction guidance screen. The rotational speed of the spool displayed on the correction guidance screen can be included in the casting log, as described above. Alternatively, the rotational speed of the spool can be calculated based on the moment of inertia of the spool and the tensile force indicated by the tensile force log. Since the rotational speed of the spool during the fishing line discharge period changes with the tensile force that acts on the fishing line, the rotational speed is considered as one part of the tensile force-related information.

The user checks the rotational speed of the spool during the fishing line discharge period that is displayed on the correction guidance screen. If, as a result of checking the display, the user notices a section in which the rotational speed is changing to a lower value than expected, the user can determine that the braking is becoming too high in said section and carry out an operation to correct the braking strength in the section to a lower value. Conversely, if the user checks the same display while thumbing in order to prevent backlash in the section in which rotational speed is changing to lower value than expected, the user can determine that the braking strength is too low in said section. Therefore, the user in this case can carry out an operation to correct the braking strength to a higher value, so that thumbing becomes unnecessary in the section.

The configuration of each of the embodiments described above is not limited to a bait casting reel. In addition to dual-bearing reels other than bait casting reels, the configuration of the present embodiment can be applied to fishing reels in which backlash could occur by the spool rotating as the fishing line is released due to casting.

The above-described processes as pertaining to the bait casting reel 100 and the user terminal device 200 can be carried out by storing a program for realizing the above-described function as the bait casting reel 100 and the user terminal device 200 in a storage medium that can be read by a computer, and causing a computer system to read and execute the program that is stored in the storage medium. Here, "causing a computer system to read and execute the program that is stored in this storage medium" includes installing the program in the computer system. The "computer system" here includes the OS and hardware such as peripheral devices. In addition, the "computer system" can also include a plurality of computer devices that are connected via a network, including the Internet and communication lines such as WAN, LAN, and dedicated lines. In addition, "storage medium that can be read by a computer" refers to storage devices such as portable media such as flexible discs, magneto-optical discs, ROM, and CD-ROM, and hard disks that are incorporated in a computer system. In this manner, the storage medium that stores the program can be a non-transitory storage medium, such as a CD-ROM. In addition, the storage medium includes an internally or externally provided storage medium that can be accessed from a distribution server in order to distribute said program. The code of the program that is stored in the storage medium of the distribution server can be different than the code of the program that is in a format that can be executed by the terminal device. That is, as long as the program can be downloaded from the distribution server and installed in a form that can be executed by the terminal device, the format in which the program is stored in the distribution server is not limited. The program can be divided into a plurality of pieces and merged on the terminal device after being downloaded at different timings, or the distribution server that distributes each of the divided programs can be different. Moreover, the "storage medium that can be read by a computer" shall also include media that retain the program for a set period of time, such as volatile memory (RAM) inside the computer system which acts as the server or the client when the program is transmitted via the network. In addition, the above-described program can realize a portion of the functions described above. Moreover, the above-described program can be a program that can realize the functions described above by combination with a program already stored in the computer system, i.e., a so-called difference file (difference program).

What is claimed is:

1. A reel braking adjustment device, comprising:

a tensile force-related information acquisition unit configured to acquire tensile force-related information, the tensile force-related information being information that is related to tensile force acting on a fishing line and detected during a fishing line discharge period in which the fishing line is released from a dual-bearing reel configured to brake rotation of a spool based on a braking parameter;

a braking parameter correction unit configured to correct braking parameters based on temporal changes in the tensile force-related information acquired by the tensile force-related information acquisition unit, and based on whether a braking parameter update trigger has occurred in accordance with a braking parameter update instruction operation carried out by a user; and a storage unit configured to store the corrected braking parameters.

2. The reel braking adjustment device according to claim 1, wherein the braking parameters include braking strength when braking is activated during the fishing line discharge period.

3. The reel braking adjustment device according to claim 1, wherein the braking parameters include braking timing at which the braking is activated during the fishing line discharge period.

4. The reel braking adjustment device according to claim 1, wherein the braking parameter correction unit is configured to display a correction guidance screen reflecting temporal changes in the tensile force-related information and correct the braking parameters in accordance with an operation carried out on the correction guidance screen.

5. The reel braking adjustment device according to claim 4, wherein the braking parameter correction unit is configured to correct the braking parameters in accordance with an operation to specify a parameter value.

6. The reel braking adjustment device according to claim 4, wherein the braking parameter correction unit is configured to correct the braking parameter of a specified correction target in response to execution of an operation providing instructions for performance of a correction specifying the correction target of the braking parameters.

7. A reel braking adjustment device, comprising:

a tensile force-related information acquisition unit configured to acquire tensile force-related information, the tensile force-related information being information that is related to tensile force acting on a fishing line and detected during a fishing line discharge period in which the fishing line is released from a dual-bearing reel configured to brake rotation of a spool based on a braking parameter; and a braking parameter correction unit configured to correct braking parameters based on temporal changes in the tensile force-related information acquired by the tensile force-related information acquisition unit, the braking parameter correction unit configured to display a correction guidance screen reflecting temporal changes in the tensile force-related information and correct the braking parameters in accordance with an operation carried out on the correction guidance screen and in accordance with an operation providing instructions for the performance of the correction.

8. A reel braking adjustment program for causing a computer as a reel braking adjustment device to function as a tensile force-related information acquisition unit that acquires tensile force-related information, the tensile force-related information being information related to tensile force acting on a fishing line and detected during a fishing line discharge period in which the fishing line is released from a dual-bearing reel including a function for braking the rotation of a spool based on a braking parameter, and a braking parameter correction unit that corrects braking parameters based on temporal changes in the tensile force-related information acquired by the tensile force-related information acquisition unit, and based on whether a braking parameter update trigger has occurred in accordance with a braking parameter update instruction operation carried out by a user, and configured to store the corrected braking parameters in a storage unit.

* * * * *